No. 633,244. Patented Sept. 19, 1899.
L. V. LABELLE.
FERTILIZER DISTRIBUTER.
(Application filed Dec. 5, 1898.)
(No Model.) 2 Sheets—Sheet 1.
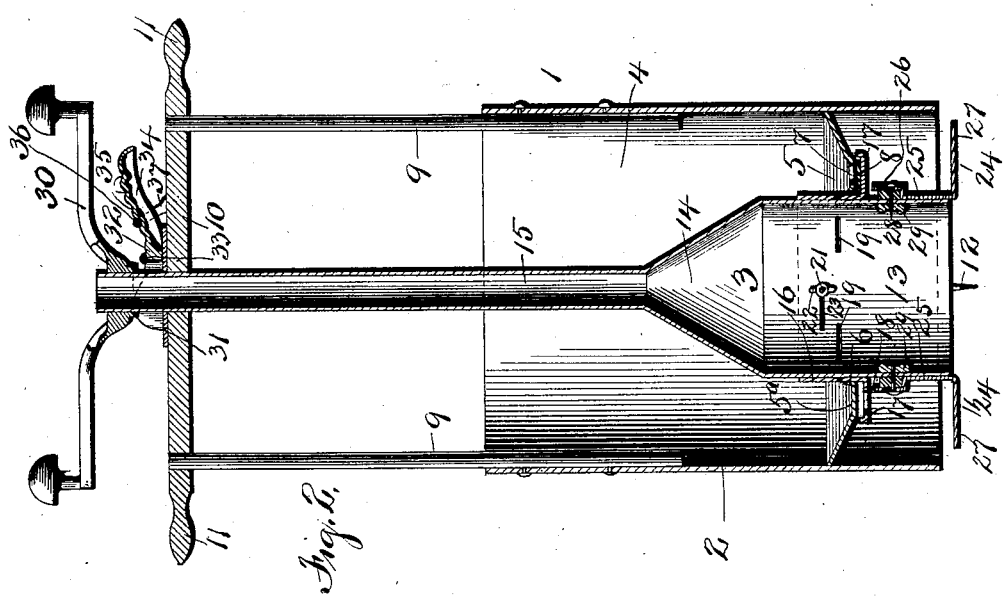
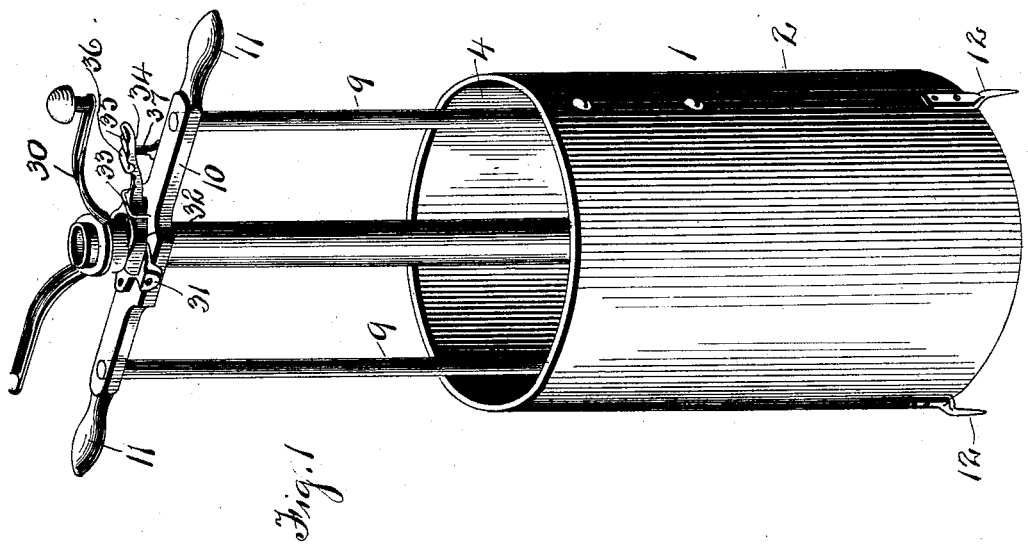
Witnesses: Louis V. Labelle, Inventor,
Horace T. Deitz By Marion Marion
Arthur Page. his Attorneys.
THE NORRIS PETERS CO., PHOTO-LITHO., WASHINGTON, D. C.

No. 633,244. Patented Sept. 19, 1899.
L. V. LABELLE.
FERTILIZER DISTRIBUTER.
(Application filed Dec. 5, 1898.)
(No Model.) 2 Sheets—Sheet 2.
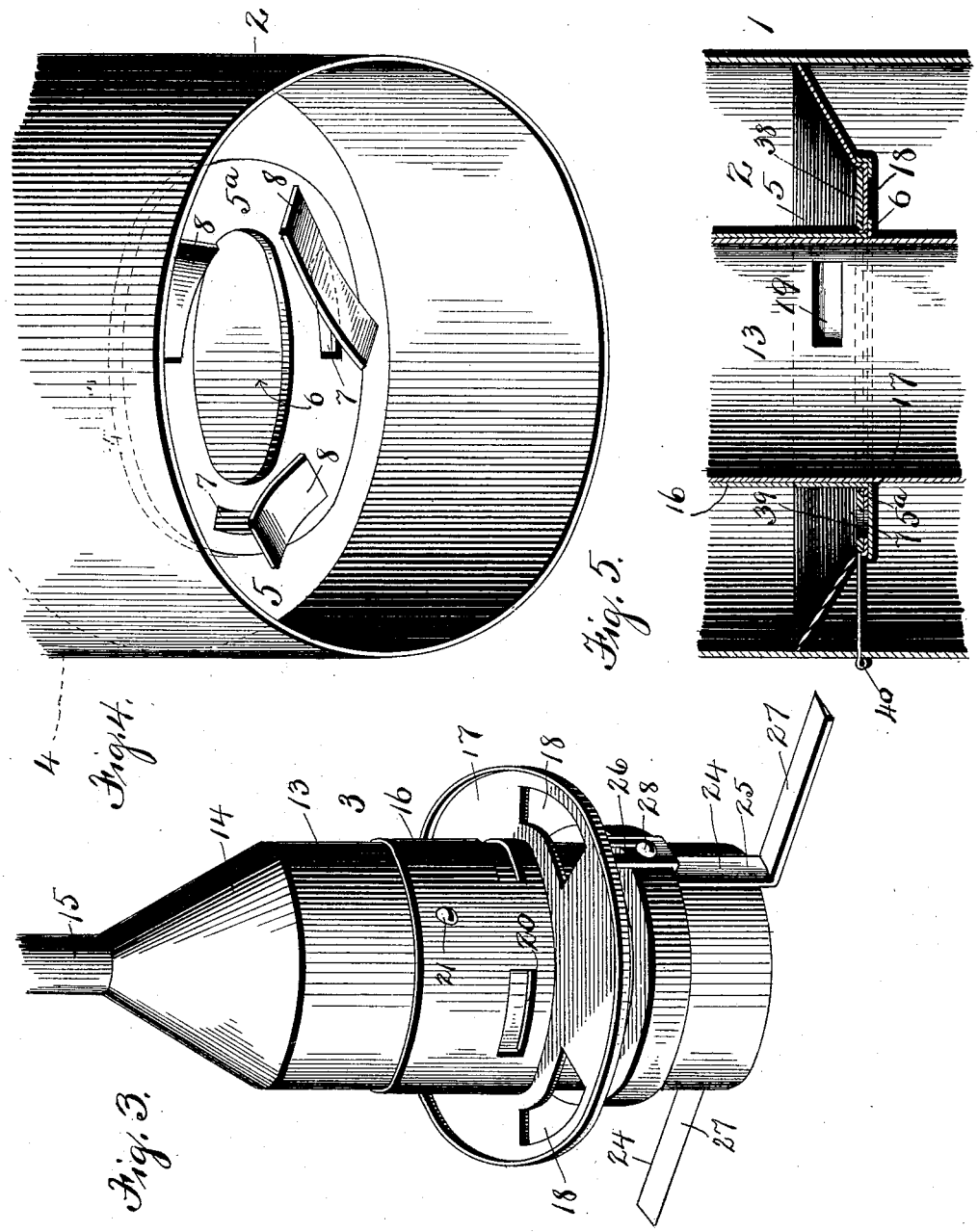
Witnesses:
Horace T. Deitz
Arthur Page
Louis V. Labelle, Inventor
By Marion & Marion
Attorneys

UNITED STATES PATENT OFFICE.

LOUIS V. LABELLE, OF ST. JACQUES DE L'ACHIGAN, CANADA.

FERTILIZER-DISTRIBUTER.

SPECIFICATION forming part of Letters Patent No. 633,244, dated September 19, 1899.

Application filed December 5, 1898. Serial No. 698,318. (No model.)

*To all whom it may concern:*

Be it known that I, LOUIS V. LABELLE, a subject of Her Majesty the Queen of Great Britain, residing at St. Jacques de l'Achigan, county of Montcalm, Province of Quebec, Canada, have invented certain new and useful Improvements in Fertilizer-Distributers; and I do hereby declare the following to be a full, clear, and exact description of the invention, such as will enable others skilled in the art to which it appertains to make and use the same.

My invention relates to improvements in fertilizer-distributers.

The object of my invention is to provide a device of this character in which the surface of the ground around the plant is effectually pulverized at the same time as the fertilizer is dropped down and thoroughly mixed with the pulverized earth, the pulverizing of the ground serving to open up the pores to the action of the air, sun, and rain.

A further object is to provide such a device with means for protecting the plant during the action of the pulverizing means.

A further object is to provide a device in which the amount of fertilizer to be dropped is regulated.

A further object is to provide a device in which the fertilizer may be dropped centrally of the distributer or in a circle about the center, as may be desired.

A further object is to provide such device with pulverizing-blades adjustably connected to the rotating portion, said blades being capable of use either centrally or concentrically, as desired.

A further object is to provide a device of this character which can be readily transported from plant to plant, which is neat and attractive in appearance, durable in construction, and which can be made at a moderate cost.

To these and other ends my invention consists in the improved construction and combination of parts hereinafter fully described, illustrated in the accompanying drawings, and particularly pointed out in the appended claims.

In the drawings, in which similar numerals of reference indicate corresponding parts in all of the views, Figure 1 is a perspective view showing my improved distributer in position for use. Fig. 2 is a central vertical sectional view of the same. Fig. 3 is a perspective view showing the rotating portion of the distributer. Fig. 4 is a similar view, looking from below, of the stationary portion of the distributer, showing the openings for the passage of the fertilizer and the valves for closing the openings. Fig. 5 is a sectional view showing a modified form of valves, &c.

The present invention is an improvement on the construction shown in my application for patent filed August 30, 1897, Serial No. 650,026, which said application was allowed on the 13th day of December, 1898. In said former application the opening for the fertilizer is formed annular about the rotating portion of the distributer, called the "protecting-drum," which opening is closed by an annular flange formed on said drum. Said opening, however, cannot be varied to regulate the quantity of fertilizer passed therethrough. Another feature of said former application consists in the limitation of the movement of the protecting-drum, it having but two limits of movement, one being the position occupied when the opening is closed, the other when it is open. The present construction varies from that shown in the former application in that the openings for the passage of the fertilizer are capable of being closed to a greater or less extent, as may be desired, thus allowing of the passage of predetermined quantities of fertilizer. Another variation consists in providing openings through which the fertilizer may pass within the protector-drum, which is advantageous when preparing the hill for the plant, in addition to allowing of the passage to the portion of the distributer without the drum, more especially useful after the plant has been placed. These passages may be used consecutively, but not concurrently. An additional variation consists in making the pulverizing-blades adjustable vertically and also removable, by reason of which they may be used to pulverize the ground either inside or outside of the protecting-drum. The mechanism for raising and lowering the protecting-drum has also been improved, the present construction allowing the drum to be adjusted to various positions and held securely in such adjusted positions.

Referring to the present invention, as shown in the accompanying drawings, 1 designates my improved distributer, consisting mainly of the stationary hopper portion 2 and the rotating protecting-drum portion 3.

The portion 2 comprises a hopper 4, preferably cylindrical in form and open at its ends, said hopper portion being provided intermediate its ends with a bottom 5, arranged in the form of an inverted cone. The bottom 5 is arranged inclined, as shown, for a portion of the diameter only, it being carried toward the center on a horizontal plane, as shown at 5ª, the central portion being cut away to provide an opening 6. The horizontal portion 5ª is provided with a number of openings 7, as shown in Fig. 4, said openings 7 being adapted by the pressing of the upper side of a similar number of spring-strips 8 to close against the under side of the horizontal portion 5ª below said openings 7, said pressure being applied as hereinafter set forth, it being understood, of course, that the normal position of the spring-strips 8 is away from the openings 7, leaving said openings free for the passage of the fertilizer. Uprights 9 are connected to opposite sides of said hopper, said uprights extending upwardly a suitable distance, being connected at their top by a suitable cross-bar 10, having handles 11, by means of which the device can be readily transported. Suitable downwardly-projecting pins or lugs 12 are secured to the periphery of said hopper at its bottom, which pins or lugs are adapted to be forced into the ground, preventing the hopper portion from rotating when the protecting-drum and its auxiliaries are being rotated, as hereinafter set forth.

The rotating protecting-drum portion 3 consists, essentially, of the protecting-drum 13, having its upper end 14 conical-shaped, and the tube 15 extending upwardly a suitable distance, the top being entirely open, affording visual access to the interior of the drum, thus enabling it to be placed properly over the plant being fertilized. As shown in Fig. 3, the drum 13 is provided with a collar 16, having a peripheral flange 17 extending outwardly therefrom, said flange being adapted to be seated against the spring-strips 8 when the drum portion 3 is placed in position. As it is necessary that means be provided to allow of the passage of the fertilizer from the openings 7 downwardly, I provide suitable openings 18 in the flange 17 corresponding to the openings 7, through which the fertilizer is adapted to pass when the spring-strips 8 are allowed to pass away from contact with the lower face of the horizontal portion 5ª and exposing the openings 7.

The drum 13 is provided with a series of openings 19, arranged to coact with a similar series of openings 20, formed in the collar 16, the openings 19 20 being adapted to be in alinement to form a series of adjustably-regulated openings between the hopper and the interior of the drum 13, or said openings may be out of alinement to prevent any fertilizer passing within the drum, the collar 16 having its position changed as desired, it being held locked in any of its positions by means of the bolt 21 and thumb-nut 22, the bolt moving within an elongated slot 23, formed in the drum 13. If desired, suitable mechanism may be used leading to the outside of the hopper for moving the collar on the protecting-drum 13 when it is desired to open and shut the openings 19 20; but in practice I have found that this is not necessary inasmuch as when said openings are in alinement, and particularly when partially closed, the fertilizer will be practically held in the hopper until the drum is rotated, as hereinafter set forth, when the fertilizer will be caused to flow through the openings 19 20.

24 designates a series of removably and adjustably mounted blades, each consisting of the vertical portion 25, having a slot 26 and the angular portion 27, the latter being adapted to pulverize the ground. These blades 24 are held in position by suitable bolts 28, passed through the slots 26 and the drum portion, thumb-nuts 29 being secured on the bolts 28 on the interior of the drum 13 similar to the thumb-nut 22. The angular portions 27 may be arranged to extend outwardly, as shown in Fig. 3, or may be extended inwardly within the drum 13 by simply removing the bolt 28 and turning the vertical or shank portion 25 in an opposite direction.

As it is essential that the rotating portion be allowed to have a vertical movement as well as a rotary, I will now describe the portions of the mechanism at the top of the distributer, these portions serving to permit both movements.

The tube 15 extends upwardly centrally through the cross-bar 10, the portion of the tube 15 above said cross-bar having a suitable rotating handle 30 secured thereon. A plate 31 is located on the cross-bar 10, the tube 15 extending therethrough, and on this plate is located a suitable forked lever 32, the forked portion being adapted to be passed beneath the collar of the handle 30, the latter resting and having movement on said forked ends. The lever 32 is held in position by means of a suitable staple 33, said lever having its rear portion 34 arranged substantially as shown in Fig. 2, the upper face being provided with suitable corrugations 35, in any one of which the angular portion 36 of a pivotally-mounted catch 37 is adapted to be placed, thus allowing the lever to be moved in various positions, each movement causing a corresponding vertical movement of the drum portion 3, and be held secure in such position by the catch 37, the drum portion 3 being capable of rotation in any of its adjusted positions.

It will be seen by this construction that when it is desired to prepare the ground for the reception of the plant, such as the tobacco-plant, the drum portion 3 is drawn to its uppermost position by simply pressing downward on the rear end of the lever 32, the catch 37 being then secured in place. The thumb-nut 22 is then loosened and the collar 16 rotated until the desired size of opening is provided by the openings 19 20, after which the thumb-nut 22 is tightened. The blades 24 are then placed in position to extend within the drum 13, when the device is ready for use. The distributer is placed in its proper position over the place where the plant is to be placed, the pins or lugs 12 extending into the ground. The handle 30 is rotated, which causes the ground to become pulverized and fertilized by the passing of the fertilizer through the openings 19 20.

When the device is to be used to fertilize the plants after they have been placed in position, the collar 16 is moved until the openings 19 20 are out of alinement and the blades 24 are returned to their normal positions. The device is then placed over the plant, the tube 15 and drum 13 allowing the user to see the plant when placing the distributer, thus preventing any liability of the plant becoming broken. As it will be seen by referring to Fig. 2, the lower end of the drum 13 extends below the plane of the hopper, and this allows said lower end to contact with and perhaps pass slightly within the ground around the plant. The lever 32 is then released to allow the drum portion 3 to drop down a proper distance, regulated by the quantity of fertilizer desired, which downward movement releases the spring-strips 8 from entirely closing the openings 7 and allows of the escape of a portion of the fertilizer, which as the handle 30 is rotated passes downward through the openings 18 into the ground, which has been prepared to receive it by the movement of the blades 24. After a suitable quantity of fertilizer has been passed from the hopper the lever 32 is depressed, raising the drum portion 3 and closing the openings.

The construction shown in Fig. 5 varies from that disclosed in the remaining figures in that the spring-strips 8 are dispensed with, a suitable ring 38, having openings 39, being arranged to coact with the horizontal portion 5ª, a suitable rod 40, secured to said ring and extending outwardly through the hopper, serving to move the ring to open and close the openings. In this connection the openings for the passage of the fertilizer are adjusted and remain the same whether the drum portion 3 is in its upper or lower position, while in the construction shown in the remaining figures the spring-strips 8 are automatically adjusted as the drum portion 3 is depressed. The advantages of this construction are thought to be apparent, and it is believed unnecessary to set them forth in detail.

In the construction shown in Figs. 1 to 4 the handles are adapted to rotate in but one direction in order that the full automatic action of the spring-strips 8 may be procured.

While the construction herein shown and described is what is believed to be a preferable embodiment of the invention, it is to be understood that I do not limit myself thereto, as various changes in the form, proportion, and minor details of construction may be resorted to, and I therefore reserve the right to modify or vary the invention as may fall within the spirit and scope thereof.

Having thus described my invention, what I claim as new is—

1. A fertilizer-distributer comprising a hopper; a rotatable drum located therein, said drum serving to regulate the passage of the fertilizing agent; and blades removably connected to said drum to mix the agent and the soil.

2. A fertilizer-distributer comprising a stationary hopper; a revoluble spindle located therein said spindle being adjustable vertically; means fixedly connected with said spindle for regulating the passage of the fertilizing agent; and means for mixing the fertilizing agent and the soil.

3. A fertilizer-distributer comprising a stationary hopper; a revoluble spindle located therein; means connected with and operated by the movement of said spindle for regulating the quantity of fertilizer passed from said hopper; and means for mixing the fertilizer with the soil.

4. A fertilizer-distributer comprising a stationary hopper; a revoluble spindle located therein; means connected with and operated by the movement of said spindle for automatically regulating the quantity of fertilizer passed from said hopper; and means for mixing the fertilizer with the soil.

5. A fertilizer-distributer comprising a stationary hopper; a revoluble spindle located therein, said spindle being adjustable vertically; means connected with and operated by the movement of said spindle for regulating the quantity of fertilizer passed from said hopper; and means for mixing the fertilizer with the soil.

6. A fertilizer-distributer comprising a stationary hopper; a revoluble spindle located therein, said spindle being adjustable vertically; means connected with and operated by the movement of said spindle for automatically regulating the quantity of fertilizer passed from said hopper; and means for mixing the fertilizer with the soil.

7. A fertilizer-distributer comprising a hopper; a rotatable drum located therein, said drum serving to regulate the passage of the fertilizing agent; and blades removably and adjustably connected to said drum to mix the agent and the soil.

8. A fertilizer-distributer comprising a hopper; an opening in said hopper; mechanism adjustably mounted in said hopper for closing said opening and means for locking said mechanism in its adjusted position.

9. A fertilizer-distributer comprising a stationary hopper; a hollow protecting-drum located within said hopper; and means for passing the fertilizing agent from said hopper said agent passing within or without said drum.

10. A fertilizer-distributer, comprising a stationary hopper; a hollow protecting-drum located within said hopper; means for passing the fertilizing agent within or without said drum; and means for mixing the fertilizer with the soil.

11. A fertilizer-distributer comprising a hopper; a spindle mounted therein, said spindle having a rotary and vertical movement, and serving to regulate the passage of the fertilizing agent; means for adjustably moving said spindle vertically; and means for holding said spindle in its adjusted vertical position.

12. A fertilizer-distributer comprising a hopper; a spindle mounted therein, said spindle having a rotary and vertical movement serving to regulate the passage of the fertilizing agent; a lever operatively connected to said spindle, for adjustably moving said spindle vertically; and means for holding said lever in any of its adjusted positions.

13. A fertilizer-distributer comprising a hopper; a series of openings leading from said hopper for the passage of the fertilizing agent; a series of spring-strips adapted to close said openings; said strips being normally in inoperative position; and means for moving said strips into operative position.

In witness whereof I have hereunto set my hand in the presence of two witnesses.

LOUIS V. LABELLE.

Witnesses:
J. A. MARION,
HORACE G. SEITZ.